E. T. FORD.
REFRIGERATION APPARATUS.
APPLICATION FILED JAN. 29, 1919.
1,413,844.
Patented Apr. 25, 1922.
3 SHEETS—SHEET 3.
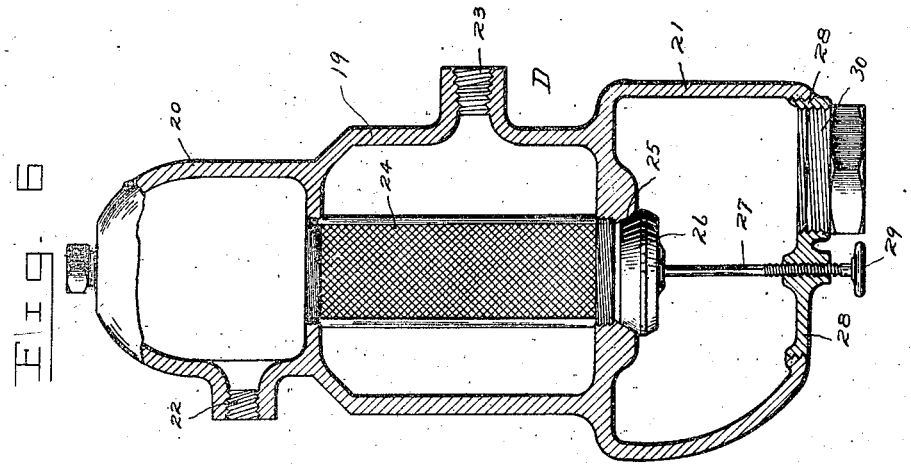
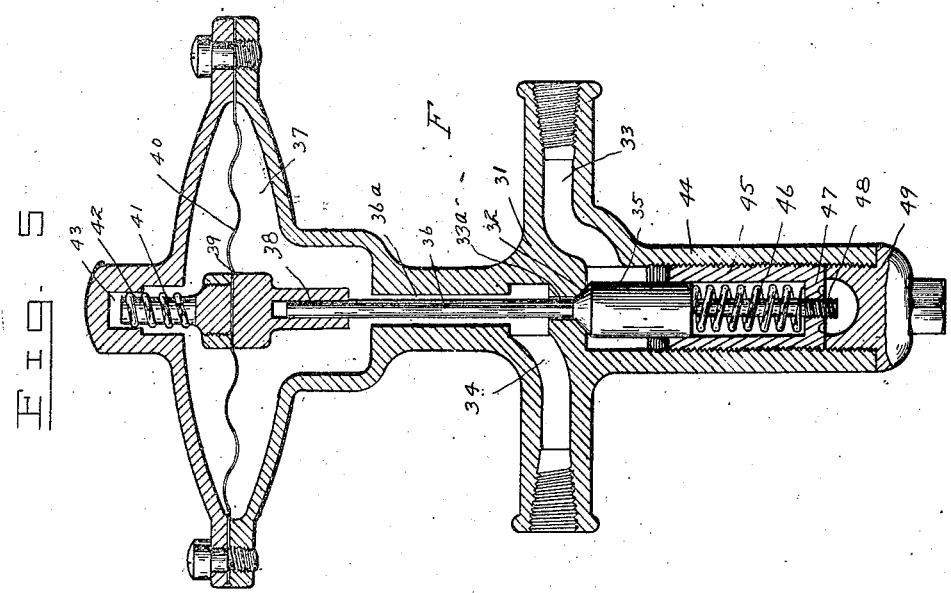
Inventor
ETHELBERT T. FORD;
By
His Attorney.

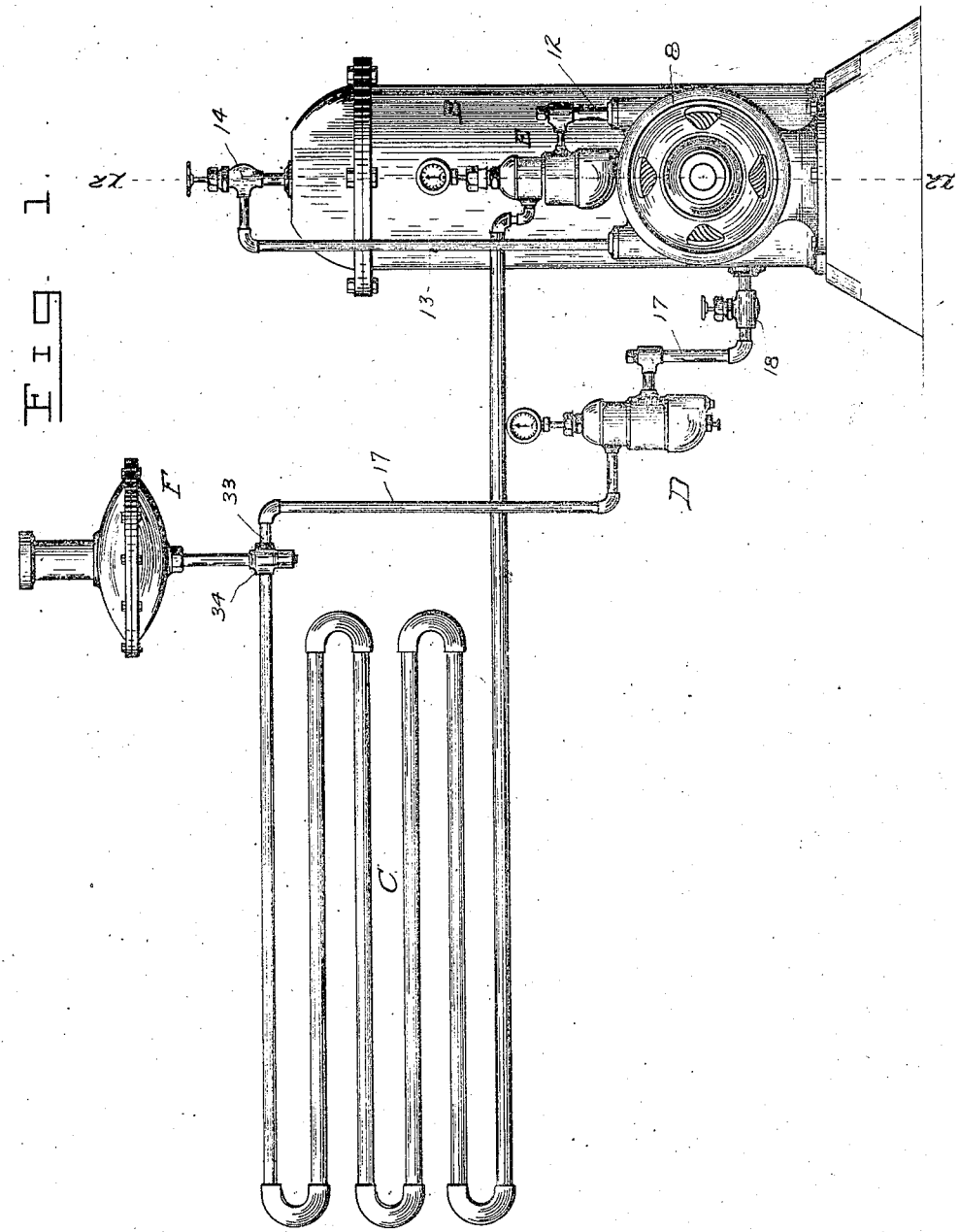

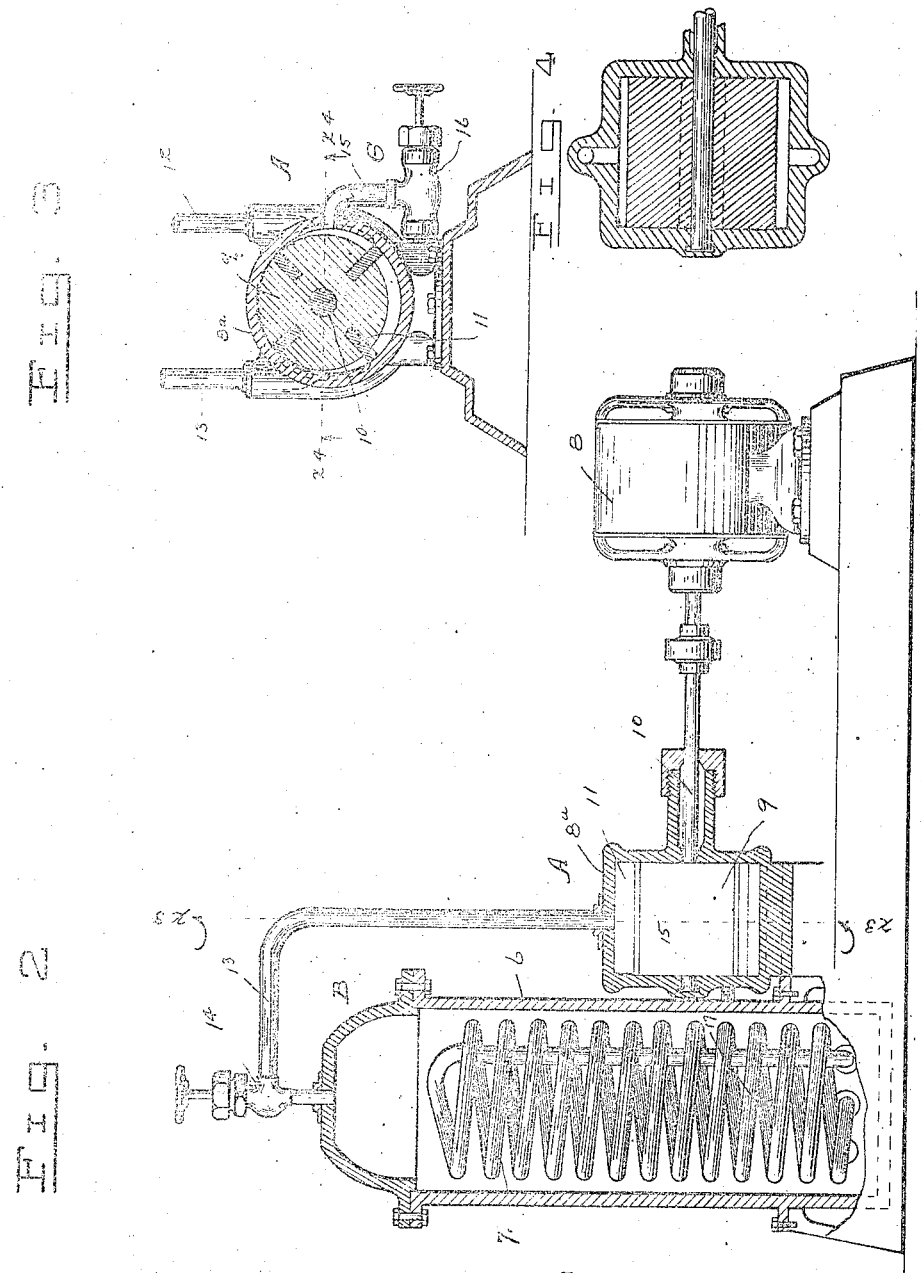

UNITED STATES PATENT OFFICE.

ETHELBERT T. FORD, OF LOS ANGELES, CALIFORNIA, ASSIGNOR TO FORDARTIC REFRIGERATION COMPANY, OF LOS ANGELES, CALIFORNIA, A CORPORATION OF CALIFORNIA.

REFRIGERATION APPARATUS.

1,413,844.  Specification of Letters Patent.  Patented Apr. 25, 1922.

Application filed January 29, 1919. Serial No. 273,706.

*To all whom it may concern:*

Be it known that I, ETHELBERT T. FORD, a citizen of the United States, residing at Los Angeles, in the county of Los Angeles and State of California, have invented a new and useful Refrigeration Apparatus, of which the following is a specification.

This invention relates to apparatus for and processes of refrigeration, and it has for it object to provide an improved apparatus and improved process whereby a relatively increased amount of potential or refrigerant may be produced with a proportionately compact and simple and inexpensive installation, in which repairs may be made with maximum convenience and a minimum of delay and interruption in use of the apparatus in carrying on of the process, in which the circuit of the refrigerating system may be kept free from obstruction or impairment by scale or other foreign substances, and in which an efficient and automatic control and operation may be carried on or conducted, and which will be generally superior in convenience and responsiveness and liability in use and practice, and in general efficiency and serviceability.

With the above and other objects in view, the invention consists in the novel and useful provision, formation, combination, association and relative arrangement and construction of parts, members and features as well as sequence and relation of steps and acts, all as hereinafter described, shown in the drawings, and finally pointed out in claims.

In the drawings:

Figure 1 is a side elevation, partly diagrammatic, of refrigerating apparatus which may be used in practicing the invention;

Figure 2 is a detail transverse sectional view of the same, taken upon the line $x^2$—$x^2$, Figure 1, parts being in elevation;

Figure 3 is a detail vertical sectional view taken upon the line $x^3$—$x^3$, Figure 2, and looking in the direction of the appended arrows;

Figure 4 is a detail transverse horizontal sectional view, taken upon the line $x^4$—$x^4$, Figure 3, and looking in the direction of the appended arrows;

Figure 5 is an enlarged detail vertical sectional view, partly in elevation, of the controlling valve shown in Figure 1; and, Figure 6 is a similar view of each of two filters shown in Figure 1.

Corresponding parts in all the figures are designated by the same reference characters.

Referring with particularity to the drawings, A designates a motor-driven compressor, B designates a condenser operatively connected therewith, and C designates a coil of pipes to which refrigerant is passed from the condenser, the spent or partially spent refrigerant returning from such coil to the compressor. D designates a filter disposed in line between the condenser and the coil C, and E designates a filter disposed in the line between the compressor and the coil of pipe C. F designates a controlling valve, operated by the low pressure or suction in the coil pipes C between the valve F and the compressor A.

Within the condenser B is received the compressed refrigerant, in gaseous form, such as sulphur dioxide ($SO_2$), the same being first received by the compressor in spent condition and then compressed and so passed to the condenser, where it is condensed into liquid form and passed in liquid form to the coil C. In the coil C the liquid $SO_2$ evaporates and cools the coil C due to the latent heat which the $SO_2$ takes up in passing from a liquid to a gas, after which the spent vapor is drawn off and again recompressed in the compressor A. Lubricating oil is also placed within the circuit of the apparatus, and the same floats upon the condensed refrigerant in the condenser. It is drawn over into the compressor from the condenser through lubrication connections G, and serves to tightly seal the compressor and prevent leakages and losses in it and in its action. Within the condenser 6 is provided a coil 7 within which cold water circulates, from any suitable source, for the purpose of condensing the refrigerant compressed and passed to the condenser by the compressor.

The compressor A is of the rotary type, having a casing or housing $8^a$ within which is mounted a rotor 9 upon a shaft 10 disposed eccentrically of the casing $8^a$, and which may be direct-driven by the motor 8, or operated from any other suitable or convenient source of power. Playing radially of the rotor 9 are a plurality of impellers which co-act in close working engagement with the inner wall of the casing 8ª, and with the end walls thereof, and serve to act upon and compress the gaseous spent refrigerant drawn into the casing 8ª by an intake pipe 12, so as to expel the compressed gaseous refrigerant through the discharge pipe 13 which leads to the top of the casing 6 of the condenser, where a suitable valve 14 is provided. The means G for connecting up the compressor with the condenser and providing lubricating oil for the compressor, comprises a pipe 15 leading from the condenser casing 6, above the level of the condensed refrigerant, to the intake side of the casing 8ª of the compressor, the same being controlled by a valve 16.

From the condenser B the condensed and liquefied refrigerant passes through a pipe 17, provided with a controlling valve 18, to the pipe coil C; and it will be understood that the pipe coil C likewise leads into and connects with the pipe 12 which extends to the intake of the compressor.

The two filters D which filter the refreshed or condensed refrigerant in the pipe 17, and the exhausted or spent refrigerant, which is to pass through the pipe 12, comprise each a central casing member 19 and upper and lower casing members 20 and 21, respectively. A connection nipple 22 is provided for receiving an inlet or outlet pipe, within the chamber 20, and a threaded nipple 23 is likewise provided for a similar purpose in the central chamber 19. Within the central chamber and extending completely from top to bottom thereof is a foraminous cage or trap 24, of less diameter than the upper and middle chambers, and through which the upper and lower chambers alone communicate with the middle chamber, and which opens at its top into the upper chamber and at its bottom into the lower chamber, in which latter case there is provided a valve seat 25 with which cooperates a valve 26 in the lower chamber 21 and having a suitable stem or the equivalent 27 threaded in a detachable bottom member 28 from the chamber 21, and having a hand-wheel 29 below such chamber whereby the valve may be operated to establish or terminate communication between the middle and lower chambers. A screw plug 30 closes a suitable opening in the bottom plate 28, and when detached permits of access to the bottom chamber to clean the same of any accumulated scale or other matter. In action, the refrigerant, whether spent or recompressed, passes through the chambers 20 and 19, and likewise through the trap or cage 24, which imprisons and directs to the lower chamber 21 any scale or other foreign matter. Normally, the valve 26 is unseated so that these foreign substances may be received within such chamber 21.

The valve F comprises a main valve casing 31 having a valve seat 32 at the lower orifice of a passage 33ª communicating at its upper end with an outlet port 34 and at its lower end with an inlet port 33. Co-acting with such seat 32 is a valve 35 having a stem 36 smaller than the passage 33ª and rising through a continuation 36ª of such passage 33ª into a diaphragm chamber 37 where it is connected by a slip joint 38 with a coupling 39 applied centrally to a diaphragm 40 spanning such chamber 37, such diaphragm being normally urged downwardly by a light coil spring 41 surrounding the upper extension 42 of the coupling 39, which extension is accommodated within a hollow cap 43 upon the upper wall of the diaphragm chamber 37. Threaded within a lower tubular extension 44 of the valve casing 31 is a tubular member 45 which embraces the lower end of the valve 35 and encloses a coil compression spring 46 appearing at one end upon the lower end of the valve 35 and at the other end upon the lower closed end 47 of the tubular member 45. Threaded in such closed end 47 is an adjustable stop pin 48 which limits the downward play of the valve 35, such valve being normally urged toward its seat by the spring 46, the compression of which may be varied by threaded adjustment of the tubular member 45. A screw cap 49 is threaded into the lower end of the extension 44.

In operation, the compressed refrigerant passes through the valve mechanism F, entering at the port 33 and exiting through the port 34, its flow being determined by the low pressure variations in the coil C, or by the "suction" of the expanding refrigerant which gasifies in the coil C. As greater demand for refrigerant in such coil is automatically registered by suction upon the diaphragm 40 through the passage 36ª, the diaphragm is pulled down so as to downwardly actuate the stem 36 and valve 35, against the spring 46, and further unseat the valve 35, so that a large flow of refrigerant may take place from the port 33 through the passage 33ª and port 34 into the coil C. A reverse operation takes place when decreased demand occurs, the diaphragm rising and permitting the spring 46 to elevate the valve 35 further toward its seat, reducing the flow of refrigerant through the ports 33 and passage 33ª. This regulating valve thus automatically supplies to the coil C the amount of refrigerant proportionate to the demands at said coil. The slip joint 38 prevents disruption or breakage or injury to the valve mechanism in the case of sudden decrease of demand upon such valve mechanism.

The method of use and advantages of the improved refrigerating apparatus, and the procedure incident to practicing the invention as to the improved process of refrigeration, all in accordance with the present invention, and with reference to the accompanying drawings, will be readily understood from such drawings, taken in connection with the foregoing description and statement and the following statement:

In a continuous operation of the apparatus and carrying on of the process, the spent or partially spent refrigerant is continually drawn into the compressor A through the pipe 12 and the filter E, from the working coil C, and in such compressor is compressed and passed over to the condenser B through the pipe 13 where it is condensed into liquid form by the cooling action of the circulating water in the coil pipe 7 within the condenser casing 6. Thence the condensed refrigerant passes through the pipe 17 and the filter D to the regulating valve and regulator F, where, under proper regulation proportionate to the demand in the coil C, such refrigeration passes to said coil where it is expanded, and gasifies, being thence withdrawn, as aforesaid, through the filter E and into the compressor A. The lubricating oil drawn into the compressor, in its action through the pipe connections G, keeps the compressor thoroughly sealed so as to prevent any escape or back slip of the refrigerant during its subjection to compression. This compressor, so lubricated, operates at much higher efficiency, in proportion to size and expense of compressor installation, than can any compressor of the ordinary horizontal acting reciprocating piston type. Also, the condenser may readily be isolated from the line by shutting off the valves 14 and 18, in case repairs are to be made, and likewise repairs may be made to the compressor without the necessity of tearing down the condenser construction as is necessary in that type of refrigerating apparatus in which the compressor unit is contained within the condenser casing. The filters always maintain a clear filtered strained condition of the refrigerant, eliminating from the line of the refrigerant any scale or other extraneous substances, all of which may be removed from the collecting chambers 27 at the openings normally closed by the plugs 30.

The regulating valve and regulator F causes the valve member 35 to always be properly positioned to permit the flow to the coil C of the proper amount of refrigerant, duly proportioned to the demands upon such refrigerating coil.

A continuous circulation of refrigerant is maintained, all in accordance with the demands on the service, as in the coil C, through such coil, the compressor, the condenser, the filters and the regulating valve F, and long continued service may thus be maintained without attention to or repair of the apparatus.

The lubricating oil withdrawn from the condenser casing to the compressor casing through the means G of course returns, in its excess, to the condenser casing, inter-mixed with the compressed refrigerant, through the pipe 13, and floats ultimately upon the condensed liquid refrigerant which occupies the lower levels of said condenser casing. The condenser casing is thus used to house a sufficient supply of lubricating oil for use in the compressor, such oil circulating through the pipe 15, the pipe 13, and the condenser and compressor casings.

It is apparent that many changes and variations may be made, with respect to the foregoing description and statements and the accompanying drawings, in the practice of the invention, without departing from the true spirit thereof.

Having thus disclosed my invention, I claim and desire to secure by Letters Patent:

1. A refrigerating apparatus, including the following named elements in combination, a condenser comprising a casing having a refrigerant outlet port adjacent the base thereof, and having an outlet port above the normal level of the condensed refrigerant, said casing likewise being provided with a refrigerant intake port in the cover member thereof; a coil pipe in said casing, having an inlet and outlet at the bottom of said casing for receiving a cooling fluid; a compressor, exterior to the condenser casing, for fluid refrigerant, having an inlet port and a delivery port for the refrigerant, and an inlet port for lubricating oil, there being piping establishing communication between the oil outlet port in the condenser casing, and inlet port for oil in the compressor, the refrigerant outlet port of the compressor and refrigerant intake port of the condenser; a working pipe coil having its ends communicating with the refrigerant outlet port in the condenser and the refrigerant intake port in the compressor, there being a filter included in said pipe coil circuit between the working unit and the compressor to prevent slugs of refrigerant being thrown into the compressor; said compressor being provided with a rotor and impeller vanes co-acting with the inner wall of the compressor casing, said rotor being mounted to rotate eccentrically within the compressor casing.

2. A refrigerating apparatus, including the following named elements in combination, a condenser comprising a casing having a refrigerant outlet port adjacent the base thereof, and having an outlet port above the normal level of the condensed refrigerant, said casing likewise being provided with a refrigerant intake port in the cover member thereof; a coil pipe in said casing, having an inlet and outlet at the bottom of said casing for receiving a cooling fluid; a compressor, exterior to the condenser casing, for fluid refrigerant, having an inlet port and a delivery port for the refrigerant, and an inlet port for lubricating oil, there being piping establishing communication between the oil outlet port in the condenser casing, an inlet port for oil in the compressor, the refrigerant outlet port of the compressor and refrigerant intake port of the condenser; a working pipe coil having its ends communicating with the refrigerant outlet port in the condenser and the refrigerant intake port in the compressor; a regulating valve through which the refrigerant passes to the working unit, and a filter included within such circuit between the working unit and the compressor to prevent slugs of refrigerant being thrown into the compressor, and another filter being included within said circuit between the condenser and the working unit to prevent clogging of the valve; valve means likewise being provided in the piping circuits for isolating the condenser from the compressor.

In testimony whereof, I have signed my name to this specification in the presence of two subscribing witnesses.

ETHELBERT T. FORD.

Witnesses:
J. SHUTT,
EDNA TURNER.